United States Patent [19]

Bowen

[11] Patent Number: 4,743,120

[45] Date of Patent: May 10, 1988

[54] WATER TEMPERATURE SENSOR FOR FAUCET OR SHOWER

[76] Inventor: John G. Bowen, Valley View Cottage, Newgrounds, Godshill, Fordingbridge, Hampshire, England

[21] Appl. No.: 25,585

[22] Filed: Mar. 13, 1987

[51] Int. Cl.$^4$ ............................................. G01K 11/06
[52] U.S. Cl. ..................................... 374/147; 374/160
[58] Field of Search ............... 374/147, 148, 160, 161, 374/162

[56] References Cited

U.S. PATENT DOCUMENTS

| | | | |
|---|---|---|---|
| 1,515,222 | 11/1924 | Ruben | 374/162 |
| 1,692,012 | 11/1928 | Wells | 374/162 |
| 3,580,079 | 5/1971 | Crites et al. | 374/160 |
| 3,651,695 | 3/1972 | Brown | 374/147 |
| 3,859,856 | 1/1975 | Keele et al. | 374/160 |
| 4,138,889 | 2/1979 | Fraschini | 374/160 |
| 4,281,543 | 8/1981 | Raz | 374/147 |

Primary Examiner—William A. Cuchlinski, Jr.
Assistant Examiner—Patrick R. Scanlon
Attorney, Agent, or Firm—Keith D. Beecher

[57] ABSTRACT

A simple and inexpensive water temperature sensor that may be mounted on existing water faucets or showers to provide a ready visible indication of the temperature of the water flowing through the faucet or shower. The temperature sensor comprises an outer transparent tube mounted coaxially with the pipe leading to the faucet or shower head, a number of O-rings mounted within the tube and spaced along the length of the tube to form different compartments along the sensor, and a number of differently colored tubular members respectively forming a second wall for the compartments, with each compartment being filled with a material, such as paraffin wax, with the material in each compartment melting at a different temperature from the material in the other compartments, to become transparent and reveal the corresponding colored inner tubular member, when the water flowing to the faucet or shower has a particular temperature.

5 Claims, 1 Drawing Sheet

WATER TEMPERATURE SENSOR FOR FAUCET OR SHOWER

BACKGROUND OF THE INVENTION

Temperature measuring devices using materials that melt at different temperatures are known. Such devices have been used for the most part as disposable clinical thermometers. For example, one type of such prior art temperature measuring device, as described in U.S. Pat. No. 3,859,856, uses a backing member and several layers of chemicals disposed in compartments on the backing member. The layers of chemicals consist of first and third layers normally separated by a second layer in each compartment. The chemicals forming the second layer having characteristics for melting at a different known temperature for each compartment. In response to the melting of the chemicals in the second layer, the chemicals in the first and third layers mix and react to form a particular color. The backing member is provided with indicia adjacent the respective compartments representative of the melting temperature of the chemical in the second layer of the associate compartment. With these devices, the sensed temperatures ascertained by reading the highest number of the indicia corresponding to the compartments having the particular color.

These prior art devices have been used primarily with human beings to measure body temperatures which generally vary within a range of 95° Fahrenheit and 105° Fahrenheit.

The present invention provides a simple temperature sensor which is used to indicate the temperature of water flowing through a pipe to a shower head or faucet. The sensor of the invention has a feature in that it may be readily mounted on existing showers and faucets. It also has a feature in that it is inherently simple in its construction and may be manufactured economically and sold at a relatively low price.

The embodiment of the invention to be described is one in which a series of compartments is provided along the pipe leading to the faucet or shower head, with each compartment being filled with a solid material, such as paraffin, which melts at successively higher temperatures for each compartment. The material in each compartment is normally solid. However, when the temperature of the water flowing through the pipe reaches a particular lever, the paraffin in one of the compartments melts, and becomes transparent. This enables the inner wall of the particular compartment to become visible, and to display a particular color. Then, as the temperature of the water increases, the paraffin in different compartments melts, so the back walls are sequentially displayed. The compartments are not necessarily sequential. Also, the progressive display of the back walls need not necessarily be linearly related to temperature changes.

Although the sensor will be described in conjunction with a faucet or shower in the home, it will become evident as the description proceeds, that the sensor of the invention has widespread application for both home and industrial use, for providing a simple means for indicating the temperature of a fluid flowing through a pipeline, or the temperature of a flat or curved surface.

DETAILED DESCRIPTION OF THE ILLUSTRATED EMBODIMENT

Figures 1, 2:
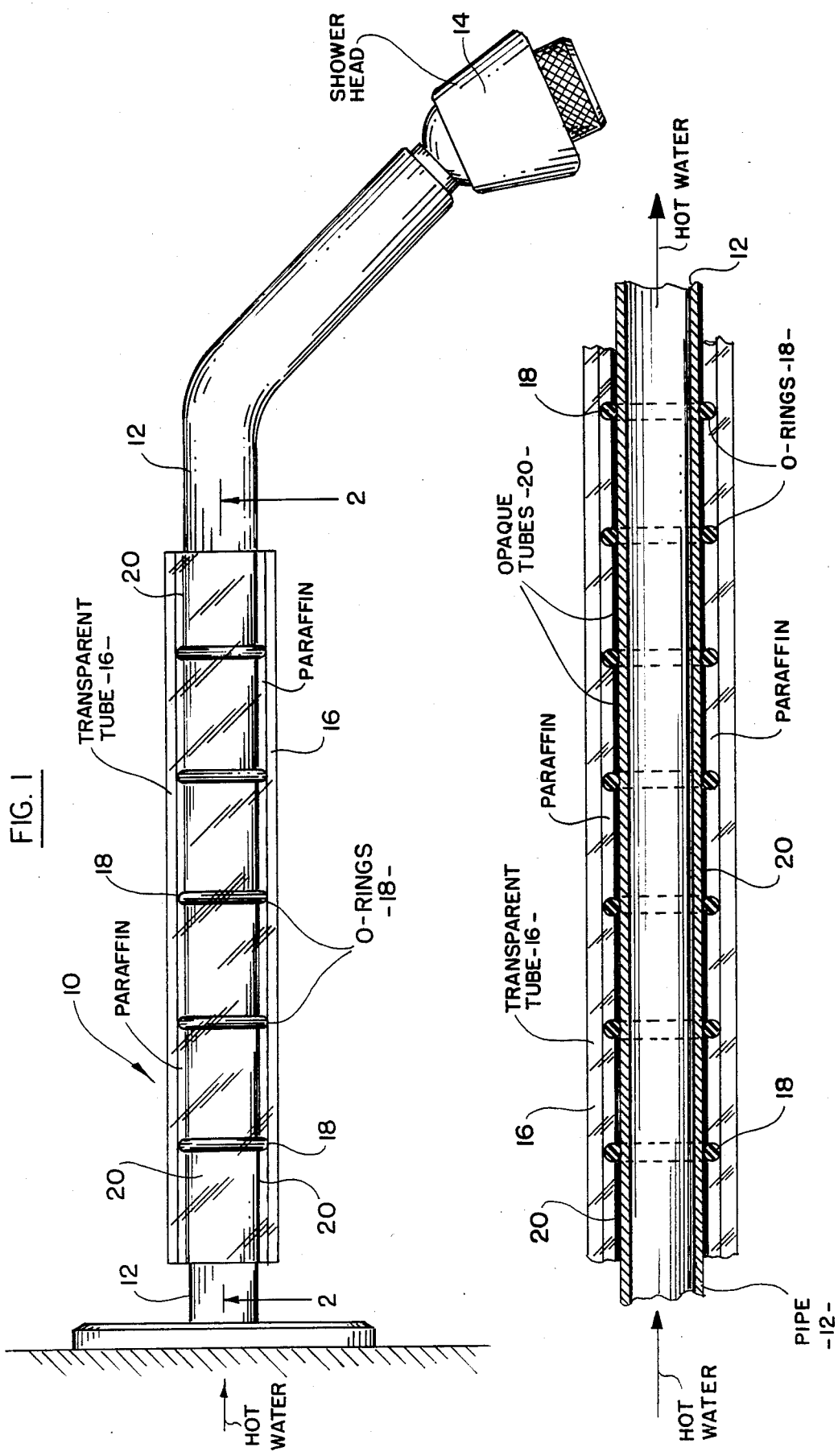
FIG. 1 shows a water temperature sensor constructed in accordance with the present invention and mounted on a pipe leading to a shower head.
FIG. 2 is a sectional view taken along the line 2—2 of FIG. 1.

The water temperature sensor of the invention is designated 10 in FIG. 1, and is shown as mounted on a pipe 12 leading to a shower head or faucet 14.

The sensor 10 includes an outer transparent tubular member 16 which is mounted in coaxial relationship about the pipe 12, and radially spaced outwardly from the pipe. A number of O-rings 18 are mounted coaxially with the pipe and are spaced along the pipe to form separate compartments, the O-rings being visible through the outer tubular member 16 as shown in FIG. 1.

A number of opaque tubes 20 are mounted coaxially about the pipe 12 and are located in the respective compartments formed by the O-rings 18. The opaque tubes are radially spaced inwardly from the transparent tube 16, so that the transparent tube forms an outer wall for the compartments, and the opaque tubes 20 form respective inner walls for the compartments. Each of the compartments is filled with a selected material, such a paraffin wax, which melts at a different temperature insofar as each compartment is concerned. Other materials also may be used, such as the temperature indicating compositions described in U.S. Pat. No. 3,946,612. The opaque tubes, of course, may take the form of opaque coatings, if so desired.

The material in the successive compartments may be selected to melt at successively higher temperatures. Accordingly, when hot water flows through pipe 12, the material in successive compartments will melt, revealing the inner opaque tubes 20 through the outer transparent tubes 16, as the solid material within the various compartments changes from an opaque state to a transparent molten state. Accordingly, the number of inner opaque tubes 20 revealed through the transparent outer tube 16 will correspond to the temperature of the water flowing through the pipe 12. The inner opaque tubes 20 may have a distinctive color, such as red, to be readily visible, Alternatively, the tubes 20 may have temperature inscription, or any other inscriptions formed on them, which become visible as the solid material between them and the outer transparent tubular member 16 melts.

The invention provides, therefore, a simple and inexpensive temperature sensor for home or industrial use, which is capable of providing readily visible indications relating to the temperature of fluid flowing through a pipeline, or the temperature of a surface.

It will be appreciated that while a particular embodiment of the invention has been shown and described, modifications may be made. It is intended in the claims to cover all modifications which come within the true spirit and scope of the invention.

I claim:

1. A fluid temperature sensor for displaying indications of the temperature of a fluid flowing through a conduit, including: a transparent outer tubular member surrounding the conduit; a plurality of annular members mounted between the conduit and the transparent tubular member and axially spaced from one another along the conduit to form individual compartments, with said transparent outer tubular member forming the outer wall of said compartments; a plurality of inner indicator tubes surrounding said conduit and individually positioned between successive pairs of said annular members, said inner tubes forming respective inner walls for the compartments; and an opaque solid material contained in each of said compartments and having a melting point different from the melting point of said material in the other of said compartments, to melt and become transparent at a particular temperature to reveal the corresponding inner indicator tube through said transparent tubular member and to be contained in the particular compartment by the outer tubular member and corresponding inner indicator tube and by the corresponding pair of said annular members.

2. The fluid temperature sensor defined in claim 1, in which the opaque solid material in each successive compartment has a successively higher melting point than the material in the preceding compartment.

3. The fluid temperature sensor defined in claim 1, in which each of said inner indicator tubes has a color which is different from the colors of the other indicator tubes.

4. The fluid temperature sensor defined in claim 1, in which said opaque solid material comprises paraffin, the paraffin in each compartment having a different melting point than the paraffin in the other compartments.

5. The fluid temperature sensor defined in claim 1, in which each of said annular members comprises an O-ring.

* * * * *